United States Patent
Rao et al.

(10) Patent No.: US 7,890,427 B1
(45) Date of Patent: Feb. 15, 2011

(54) AUTHENTICATION OF NOTIFICATIONS RECEIVED IN AN ELECTRONIC DEVICE IN A MOBILE SERVICES NETWORK

(75) Inventors: Bindu Rama Rao, Laguna Niguel, CA (US); Sunil Marolia, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1678 days.

(21) Appl. No.: 10/754,378

(22) Filed: Jan. 9, 2004

Related U.S. Application Data (60) Provisional application No. 60/438,870, filed on Jan. 9, 2003.

(51) Int. Cl.
- G06F 21/00 (2006.01)
- G06F 9/44 (2006.01)
- G06F 9/445 (2006.01)

(52) U.S. Cl. .................. 705/51; 717/173; 717/174
(58) Field of Classification Search .............. 705/51; 717/173, 174

See application file for complete search history.

(56) References Cited

U.S. PATENT DOCUMENTS

| | | | |
|---|---|---|---|
| 5,261,055 A | 11/1993 | Moran et al. ............ 395/275 |
| 5,442,771 A | 8/1995 | Filepp et al. ............ 395/650 |
| 5,479,637 A | 12/1995 | Lisimaque et al. ....... 395/430 |
| 5,579,522 A | 11/1996 | Christeson et al. ...... 395/652 |
| 5,596,738 A | 1/1997 | Pope ..................... 395/430 |
| 5,598,534 A | 1/1997 | Haas .................. 395/200.09 |
| 5,608,910 A | 3/1997 | Shimakura ............. 395/670 |
| 5,623,604 A | 4/1997 | Russell et al. ......... 395/200.1 |
| 5,666,293 A | 9/1997 | Metz et al. ........... 395/200.5 |
| 5,752,039 A | 5/1998 | Tanimura ............... 395/712 |
| 5,778,440 A | 7/1998 | Yiu et al. ............... 711/154 |
| 5,790,974 A | 8/1998 | Tognazzini ............. 701/204 |
| 5,835,911 A * | 11/1998 | Nakagawa et al. ....... 707/203 |
| 5,878,256 A | 3/1999 | Bealkowski et al. ...... 395/652 |
| 5,933,604 A * | 8/1999 | Inakoshi ................ 709/226 |
| 5,960,445 A | 9/1999 | Tamori et al. .......... 707/203 |
| 5,974,312 A * | 10/1999 | Hayes et al. ............ 455/419 |
| 6,009,497 A | 12/1999 | Wells et al. ............ 711/103 |
| 6,038,636 A | 3/2000 | Brown, III et al. ...... 711/103 |
| 6,064,814 A | 5/2000 | Capriles et al. ......... 395/701 |
| 6,073,206 A | 6/2000 | Piwonka et al. ......... 711/102 |
| 6,073,214 A | 6/2000 | Fawcett ................. 711/133 |
| 6,088,759 A | 7/2000 | Hasbun et al. .......... 711/103 |
| 6,105,063 A | 8/2000 | Hayes, Jr. .............. 709/223 |
| 6,112,024 A | 8/2000 | Almond et al. .......... 395/703 |
| 6,112,197 A | 8/2000 | Chatterjee et al. ........ 707/3 |

(Continued)

FOREIGN PATENT DOCUMENTS

| CA | 2339923 | 3/2000 |
|---|---|---|

(Continued)

*Primary Examiner*—Charles C Agwumezie (57) ABSTRACT

Disclosed herein is an electronic device in a mobile services network. The electronic device may be provided access to a plurality of services including an firmware/software update service and update notifications of availability of update packages. In response to receiving an update notification, the electronic device may confirm the authenticity of the received update notification before downloading the associated update package from a management server in the mobile services network. Short message service notifications may be sent from a customer care center or management server employing a short message center in an embodiment of the present invention.

39 Claims, 5 Drawing Sheets

U.S. PATENT DOCUMENTS

| | | | |
|---|---|---|---|
| 6,123,737 A * | 9/2000 | Sadowsky | 717/173 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,314,425 B1 * | 11/2001 | Serbinis et al. | 707/10 |
| 6,424,966 B1 * | 7/2002 | Meyerzon et al. | 707/610 |
| 6,438,585 B2 | 8/2002 | Mousseau et al. | 709/206 |
| 7,007,083 B1 * | 2/2006 | Chesley | 709/224 |
| 7,711,782 B2 * | 5/2010 | Kim et al. | 709/206 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2001/0052052 A1 * | 12/2001 | Peng | 711/133 |
| 2002/0073304 A1 * | 6/2002 | Marsh et al. | 713/1 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2004/0153549 A1 * | 8/2004 | Naito et al. | 709/228 |
| 2006/0282834 A1 * | 12/2006 | Cheng et al. | 717/174 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

AUTHENTICATION OF NOTIFICATIONS RECEIVED IN AN ELECTRONIC DEVICE IN A MOBILE SERVICES NETWORK

CROSS-REFERENCE TO OTHER APPLICATIONS

The present application claims the benefit of priority of U.S. Provisional Patent Application having Ser. No. 60/438,870, filed on Jan. 9, 2003, and hereby incorporates herein by reference the complete subject matter thereof in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000, and U.S. Provisional Patent Application having Ser. No. 60/422,048, filed Oct. 29, 2002, in their respective entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically released to fix the bugs, introduce new features, or both.

It may be difficult to inform/notify an electronic device of the need to update the device's firmware/software and it may also be difficult to determine whether an update notification received is authentic. An unauthorized, illegal, software hacker may attempt to infiltrate an electronic device management server and send a notification to an electronic device to compel the device to retrieve an unauthorized, spurious update package.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method of updating an electronic device. The method may comprise receiving a notification in the electronic device and determining the authenticity of the notification in the electronic device. The notification may comprise, for example, one of a short message service (SMS) notification, an instant messaging (IM) notification, an email notification, a wireless application protocol (WAP) push message notification, and an enhanced messaging service (EMS) notification. The electronic device may comprise, for example, one of a mobile cellular phone handset, a personal digital assistant, a pager, an MP3 player, and a digital camera.

In an embodiment of the present invention, the method may further comprise informing the electronic device of availability of at least one update package for updating at least one of firmware and software resident in the electronic device and simultaneously informing a notification history server that a notification has been sent to the electronic device.

In an embodiment of the present invention, determining the authenticity of the notification may comprise contacting a notification history server, the notification history server keeping a record of notifications sent to the electronic device.

In an embodiment of the present invention, the method may further comprise ignoring the notification in the electronic device upon determining that the notification is inauthentic, recording that an inauthentic notification has been received, and waiting to receive another notification in the electronic device.

In an embodiment of the present invention, the method may further comprise determining identification information of a server and update package associated with the notification upon determining that the notification received in the electronic device is authentic.

In an embodiment of the present invention, the method may further comprise retrieving the update package and performing an update of at least one of firmware and software resident in the electronic device.

In an embodiment of the present invention, determining the authenticity of the notification in the electronic device may further comprise determining whether the notification was sent from an authorized server. An authorized server may comprise one of a management server and a customer care center, for example.

In an embodiment of the present invention, the notification may comprise location and identification information regarding a management server providing access to an update package and information regarding the update package. The location and identification information may comprise, for example, at least one of a universal resource locator, an interne protocol address, a dynamic security key, end-user data, program update information, download scheduling information, and notification protocol information.

In an embodiment of the present invention, the method may further comprise retrieving an update package from a default management server by accessing an address of the default management server when no server address information is included in the notification. The address of the default management server may be provisioned in the electronic device during a bootstrap provisioning event. In one embodiment, retrieving the update package from the default management server is performed after authentication of the notification message.

In an embodiment of the present invention, the method may further comprise retrieving an update package via a download agent in the electronic device and updating at least one of firmware and software in the electronic device via an update agent in the electronic device.

In an embodiment of the present invention, the method may further comprise preventing unauthorized updates of at least one of firmware and software in the electronic device. In one embodiment, preventing unauthorized updates may further comprise a notification being sent to the electronic device that may be discernable by an end-user. The end-user may be prompted to initiate an update process. When the end-user initiates the update process, the electronic device may be adapted to determine the authenticity of the notification, and abort the update process if the notification is determined to be inauthentic. Alternatively, the electronic device may permit the update package to be downloaded, if the notification is determined to be authentic.

In an embodiment of the present invention, preventing unauthorized updates may further comprise receiving a dynamic key component from a management server in the electronic device, accessing a static key component from memory in the electronic device, and instructing a download agent to use the dynamic key component and the static key component to generate a security key. The generated security key may facilitate access to a downloadable update package in an update package repository if the electronic device is authorized access to the update package, otherwise the electronic device may be denied access to the update package.

Aspects of the present invention may be found in a mobile services network. The network may at least comprise at least one electronic device, a management server communicatively linked with the at least one electronic device via a communication link, and a notification history server operatively connected to the management server. The notification history server may comprise a record of authentic notifications sent to the at least one electronic device.

In an embodiment of the present invention, the electronic device may at least comprise non-volatile memory, a short message entity, random access memory, and security services.

In an embodiment of the present invention, the non-volatile memory in the electronic device may at least store an update agent, a firmware and real-time operating system, an operating system layer, a download agent or browser, and an end-user related data and content.

In an embodiment of the present invention, the electronic device may comprise one of a mobile cellular phone handset, personal digital assistant, pager, MP3 player, and a digital camera.

In an embodiment of the present invention, the electronic device may be adapted to receive notifications informing the electronic device of availability of update packages at the management server. The electronic device may also be adapted to determine the authenticity of the notifications by contacting the notification history server.

In an embodiment of the present invention, the notification history server may be adapted to determine whether a notification is authentic by examining message identification information in the notifications.

In an embodiment of the present invention, the electronic device may be adapted to download an update package from an update package repository using an update agent upon determining that a notification received in the electronic device is authentic.

In an embodiment of the present invention, the electronic device may be adapted to determine whether a notification originated from an authorized sender.

In an embodiment of the present invention, an authorized sender may be at least one of the management server and a customer care center resident in the network.

In an embodiment of the present invention, the network may further comprise a short message center adapted to store and forward messages to and from the electronic device. The short message center may be adapted to send, upon instruction from the management server or a customer care center, notifications to the electronic device regarding availability of update packages.

In an embodiment of the present invention, notifications may comprise at least one of a short message service (SMS) notification, an instant messaging (IM) notification, an email notification, a wireless application protocol (WAP) push message notification, and an enhanced messaging service (EMS) notification.

In an embodiment of the present invention, the network may further comprise at least one user data field containing message identification information.

In an embodiment of the present invention, notifications may further comprise location and identification information regarding a management server providing access to an update package and information regarding the update package.

In an embodiment of the present invention, location and identification information may comprise at least one of a universal resource locator, an internet protocol address, a dynamic security key, end-user data, program update information, download scheduling information, and notification protocol information.

In an embodiment of the present invention, upon determining that a notification received in the electronic device is inauthentic, the electronic device may ignore the notification and waits for another notification. A record may also be created recording that an inauthentic notification has been received.

In an embodiment of the present invention, the management server may comprise the notification history server and an update package repository.

In an embodiment of the present invention, the notification history server may be incorporated into a short message center in the network.

In an embodiment of the present invention, the network may further comprise a security service in the electronic device for preventing unauthorized updating of at least one of firmware and software in the electronic device.

In an embodiment of the present invention, preventing unauthorized updates may comprise that a notification may be sent to the electronic device which may be discernable by an end-user. The end-user may be prompted to initiate an update process. When the end-user initiates the update process, the electronic device may be adapted to determine the authenticity of the notification, and abort the update process if the notification is determined to be inauthentic. Alternatively, the electronic device may permit the update package to be downloaded, if the notification is determined to be authentic.

In an embodiment of the present invention, preventing unauthorized updates may further comprise receiving a dynamic key component from a management server in the electronic device, accessing a static key component from memory in the electronic device, and instructing a download agent to use the dynamic key component and the static key component to generate a security key. The generated security key may facilitate access to a downloadable update package in an update package repository if the electronic device is authorized access to the update package. Otherwise, the electronic device may be denied access to the update package.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

DETAILED DESCRIPTION OF THE DRAWINGS

Figure 1:
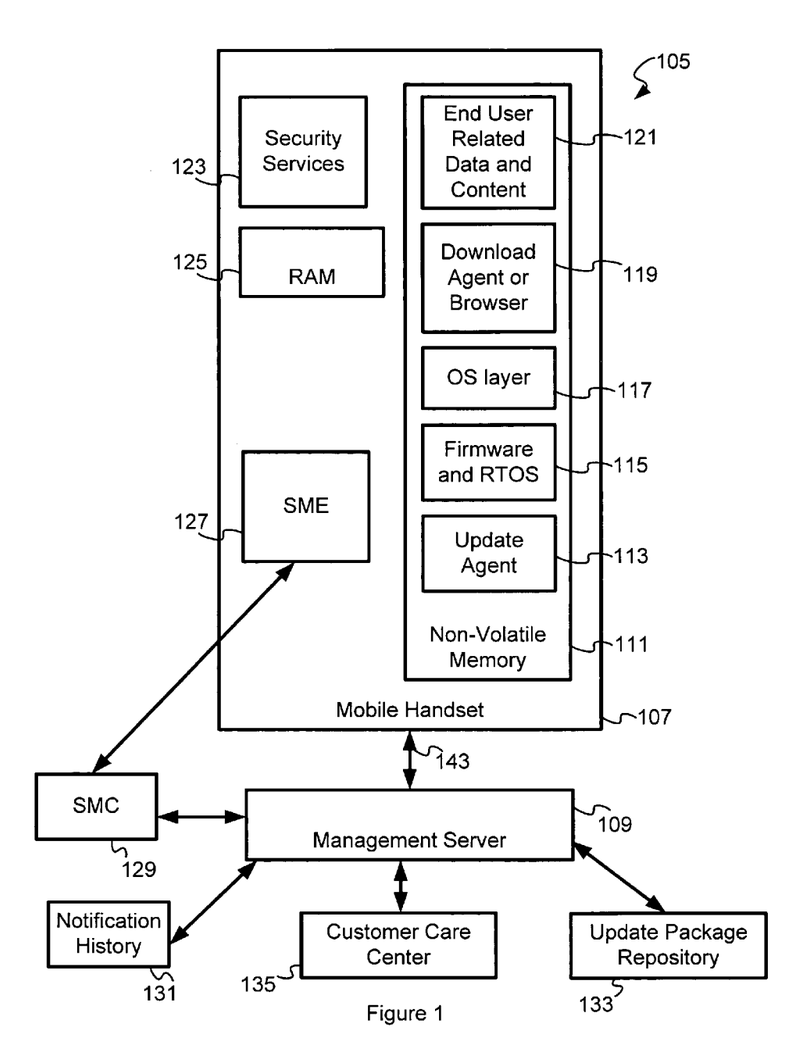
FIG. 1 is a block diagram illustrating a mobile services network wherein an electronic device has access to a plurality of services according to an embodiment of the present invention.

FIG. 1 is a block diagram illustrating a mobile services network wherein an electronic device has access to a plurality of services according to an embodiment of the present invention. An electronic device may be for example, a mobile electronic device having software/firmware, such as, mobile cellular phone handsets, personal digital assistants (PDA's), pagers, MP3 players, digital cameras, etc.

FIG. 1 illustrates a mobile services network 105 wherein an electronic device, for example, mobile handset 107, may be provided access to a plurality of services including a firmware/software update service. The electronic device may also receive notifications, such as short message service (SMS) notifications, of the availability of update packages. An update package may comprise firmware/software updates that modify or change the version of a particular firmware/software, for example upgrading to a newer version. An update package may also add new services to the electronic device or delete services as desired by the service provider or an end-user.

In response to the notifications, the electronic device may confirm the authenticity of received notifications before initiating download of an update package from a management server 109 via a communications link 143. The mobile services network 105 may comprise an electronic device, for example, mobile handset 107, short message center (SMC) 129, management server 109, notification history server 131, customer care center 135, and update package repository 133.

The electronic device, e.g., mobile handset 107, may comprise non-volatile memory 111, random access memory (RAM) 125, security services 123, and short message entity (SME) 127. The non-volatile memory 111 of the electronic device may comprise update agent 113, firmware and real-time operating system (RTOS) 115, operating system (OS) layer 117, download agent or browser 119, and end user related data and content 121.

The electronic device, e.g., mobile handset 107, may receive notifications informing the device of the availability of update packages at the management server 109. Such notifications may originate from either management server 109 or customer care center 135. In response to such notifications, the electronic device may authenticate notifications by contacting notification history server 131.

Notification history server 131 may maintain details of notifications sent to the electronic device, e.g., mobile handset 107. Once the electronic device determines that a received notification is authentic, i.e., originated from an authorized sender, for example, customer care center 135, the electronic device may download an update package from the update package repository 133 employing the download agent or browser 119 in the electronic device. Subsequently, the electronic device may employ update agent 113 to update the firmware/software, etc. in the electronic device, e.g., mobile handset 107.

Figure 1A:
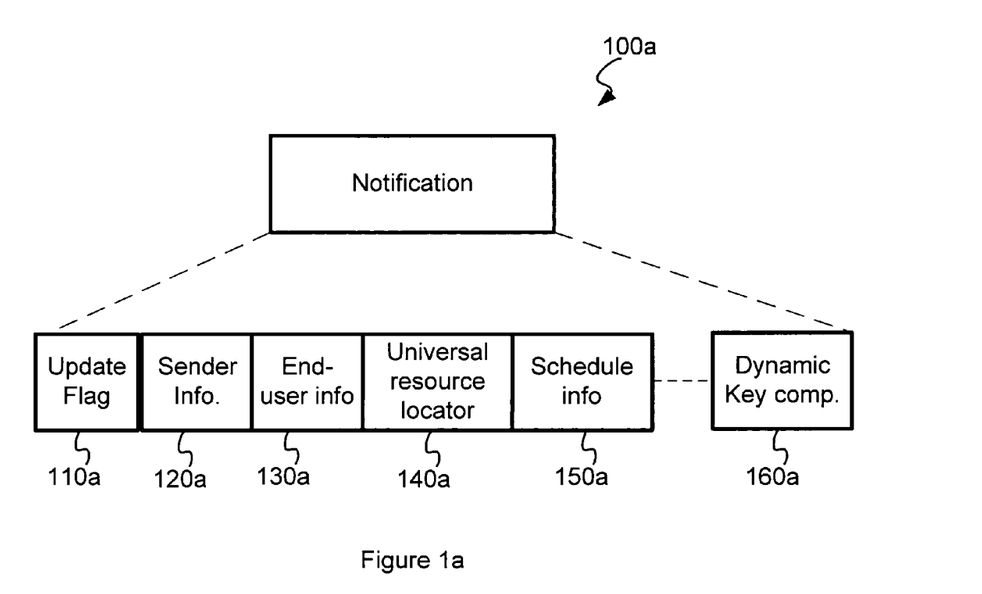
FIG. 1a is a block diagram illustrating an exemplary notification message format according to an embodiment of the present invention.

FIG. 1a is a block diagram illustrating an exemplary notification message format according to an embodiment of the present invention. In FIG. 1a, notification message 100a may comprise an update flag 110a, or some other type of flag identifying the purpose of the notification, for example a delete flag, modify flag, etc. Additionally, the notification may also comprise at least sender information 120a, end-user information 130a, a universal resource locator 140a or some other type of address information, schedule information 150a, and a dynamic key component 160a, etc.

The sender information 120a may comprise information corresponding to the server sending the notification and particulars related to the type of modification/update being offered by the notification. The end-user information 130a may comprise a code relating to the electronic device or personalized greetings, etc.

The universal resource locator 140a may alternatively be an internet protocol address or other type of address. The schedule information 150a may comprise a date and time for which the update/modification may be made available for a particular electronic device or geographical region. The dynamic key component 160a will be discussed in more detail below. Although the above named exemplary notification information categories (110a-160a) have been illustrated and described, other different notification information categories may be included in notification messages as desired or necessary.

Referring back to FIG. 1, short message center (SMC) 129 may be adapted to store and forward messages to and from the electronic device, e.g., mobile handset 107. Short message entity (SME) 127 may be located in a fixed network or alternatively in the electronic device to receive and send short messages. When instructed by management server 109 or customer care center 135, SMC 129 may send notifications to the electronic device regarding availability of update packages, along with other additional related information.

The electronic device may monitor such notifications and determine whether the notifications are related to update activity. The electronic device may ascertain the validity of received notifications by contacting notification history server 131 and verifying that the notifications were indeed sent by an authorized server/sender, for example, management server 109 or customer care center 135. The electronic device may download an associated update package once the notification has been verified.

In an embodiment according to the present invention, the user data field of a received SMS message may contain message identification information which may be employed by the electronic device to determine whether a notification received originated from an authorized source, for example, management server 109, or an unauthorized source, for example, an unauthorized server trying to compel the electronic device to retrieve a spurious update package.

The electronic device may send message identification information retrieved from the notification to notification history server 131 to determine whether the notification history server 131 has a record of such a notification. If the notification history server 131 confirms knowledge of the notification, then the electronic device may download an associated update package and perform an update of the firmware/software, etc. However, if notification history server 131 is unable to confirm knowledge of the notification based upon the message identification information received from the electronic device, then the electronic device may ignore the received notification and continue normal processing.

In an embodiment according to the present invention, management server 109 instructs SMC 129 to send an SMS notification to the electronic device. The SMS notification may contain, for example, unique message identification information, a reference to an update package encapsulated as a universal resource locator (URL), or some other information. The management server 109 may also simultaneously inform notification history server 131 of the notification being sent to the electronic device.

The electronic device may receive the SMS notification containing the unique message identification information, etc., and may then contact the notification history server 131 to determine the authenticity of the received notification. After determining that the notification is authentic, (i.e., the notification originated from an authorized server/sender, for example, management server 109), the electronic device may subsequently download the update package employing, for example, a URL provided in the notification.

Table 1 below illustrates an exemplary notification table recording notifications encountered by an electronic device is illustrated below.

TABLE 1

Notification History Server Notification Table

| Time Stamp | Notification Type | Server Sender Address | Verified | Electronic Device ID |
|---|---|---|---|---|
| 091109192003 | modify software | www.sample1.com | yes | abc1 |
| 111510062003 | update software | www.sample1.com | yes | abc2 |
| 122910102003 | modify software | www.sample1.com | yes | abc3 |
| 101110302003 | modify software | www.fraud1.com | no | abc1 |
| 000611012003 | delete software | www.virus1.com | no | abc3 |
| 142911292003 | modify software | www.sample1.com | yes | abc2 |
| 181612012003 | update software | www.sample1.com | yes | abc2 |
| 221012152003 | delete software | www.virus1.com | no | abc2 |
| 091712272003 | modify software | www.fraud1.com | no | abc3 |
| 103101012004 | Update software | www.sample1.com | yes | abc1 |

Table 1 above discloses numerous entries recording notifications received by an electronic device and the resolution of those notifications.

In Table 1 above, numerous notifications received by a plurality of electronic devices are illustrated. The values in Table 1 are exemplary values, however, numerous other and different values may be provided as desired by security services or end-user demands. When a notification has been received by an electronic device, the electronic device may consult the notification history server to determine whether the notification received is authentic or inauthentic.

The date/time may be recorded under the heading Time Stamp. The type of notification may be recorded under the heading Notification Type, and the type of notification may comprise an update notification, a modification notification, a deletion notification, etc. The address of the server sending the notification may be recorded under the heading Server Sender Address, and may be an internet protocol (IP) address, universal resource locator (URL), or some other type of identifying address.

The result of the authentication/verification may be recorded under the heading Verified, and whether the notification, i.e., the sender of the notification is recognized by the notification history server. The identity of the electronic device receiving the notification may also be recorded under the heading Electronic Device ID, and may be represented by some alpha-numeric code, for example. A plurality of electronic device may be provided authentication of notification services.

The notification history server may record the time/date when the notification was received, the type of notification that was received, where the notification originated, for example the address of the server sending the notification, and whether or not the notification has been verified as authentic in a table, for example Table 1.

Because hackers may make repeated attempts to infect an electronic device with a virus or steal information from electronic devices and servers communicating with the electronic devices, the notification history server may maintain a record of not only verified servers and their respective addresses, but also unverified servers and their respective addresses. In this way, once a server, i.e., sending address, has been branded hostile, additional notification messages originating from the branded server may immediately be identified as unverified, and thereafter be ignored.

In an embodiment according to the present invention, the electronic device may request management server 109 to determine whether the notification is authorized. The electronic device may also employ the notification history server 131 to determine the authenticity of the SMS notification.

In an embodiment according to the present invention, customer care center 135 may send an SMS message to the electronic device employing SMC 129. The SMS message may contain information associated with the update package to be retrieved from update package repository 133 and applied by the electronic device. The customer care center 135 may also cause an entry to be created in notification history server 131 to record that an SMS notification was sent to the electronic device. The electronic device may contact the notification history server 131 to determine the authenticity of the received notification prior to contacting management server 109 to retrieve the associated update package.

In an embodiment according to the present invention, the SMS message may contain schedule information, identifying when download of an update package should be performed by the electronic device, as part of the notification message.

In an embodiment according to the present invention, enhanced messaging service (EMS) may be employed by the mobile services network 105 instead of SMC 129. An EMS notification may be sent from an EMS compliant server to an EMS compliant electronic device. EMS is a message transmission service adapted to send a richer/broader message containing combinations of text, simple melodies, pictures (simple, black and white), animations, etc., to an EMS compliant electronic device. EMS technology may extend the user data header (UDH) in SMS. The UDH may be adapted to include binary information in the message header. The UDH may also be applicable in existing services networks without upgrading the network infrastructure. In order for electronic devices to apply EMS technology, the electronic devices, may of course necessarily be EMS compliant.

In an embodiment according to the present invention, notification of update package availability may be sent using multimedia messaging service (MMS). MMS uses standardized protocols such as, wireless application protocol (WAP), mobile station application execution environment (MExE), and simple mail transfer protocol (SMTP). MMS may also employ a dedicated channel and work complimentarily with an MMS server and MMS user databases.

In an embodiment according to the present invention, the notification history server 131 and update package repository 133 may be incorporated into management server 109.

In an embodiment according to the present invention, the notification history server 131 may be incorporated into SMC 129.

In an embodiment according to the present invention, the notification history server 131 may be part of a broader customer care center 135 for the mobile services network 105. The customer care center 135 may instruct SMC 129 to send notifications and save information related to the notifications sent, such as message identification information. The customer care center 135 may also provide the saved information to management server 109 to facilitate authenticity verification of notifications.

In an embodiment according to the present invention, customer care center 135 may send a notification to the electronic device indicating availability of an appropriate update package. The notification may be sent via SMS transport provided by SMC 129. The customer care center 135 may also instruct the notification history server 131 to record that a notification was sent to the electronic device and to associate unique message identification information with the record. The notification may also include message identification information which may be used to verify the authenticity of the notification message.

The electronic device may contact management server 109 (or another authorized server, if reference to one is provided in the notification message) and use the message identification information to verify the authenticity of the received notification. Management server 109 may respond by confirming the authenticity of the message identification information complimentarily with notification history server 131. The management server 109 may also return a dynamic key component to the electronic device which may subsequently be used as part of a security key for secure communications and access to secure data resources in conjunction with a static key component available in the electronic device, for example an electronic device identifier or end-user identification information.

The electronic device may receive the dynamic key component and store it in memory, such as RAM 125 or non-volatile memory 111, for subsequent access, usage, and combination with a static security key component, as part of a symmetric or asymmetric security key. The electronic device may also instruct the download agent or browser 119 to use the dynamic key component and the static key component to generate or compute a security key, which may be applied to provide access to download an update package, for example from update package repository 133 via management server 109. By applying this form of security, data resources on dedicated servers may be protected from unauthorized access while those electronic devices supplying an authorized security key may be provided access to downloadable resources.

In an embodiment according to the present invention, management server 109 may communicate the dynamic key and a schedule for download of an update package to the electronic device when the electronic device attempts to authenticate a received SMS update package associated notification. For example, an update may be available for download at a particular time, on/after a particular date, or for a particular period of time.

In an embodiment according to the present invention, an update package associated notification received by the electronic device may include, for example, a URL for a server managing access to the update package, such as management server 109. The electronic device may determine whether the server referred to by, for example, the URL in the notification message, is an authorized server by using known secure identification techniques. If the electronic device determines that the server is an authorized server, then the electronic device may download the appropriate update package employing the download agent or browser 119.

Figure 2:
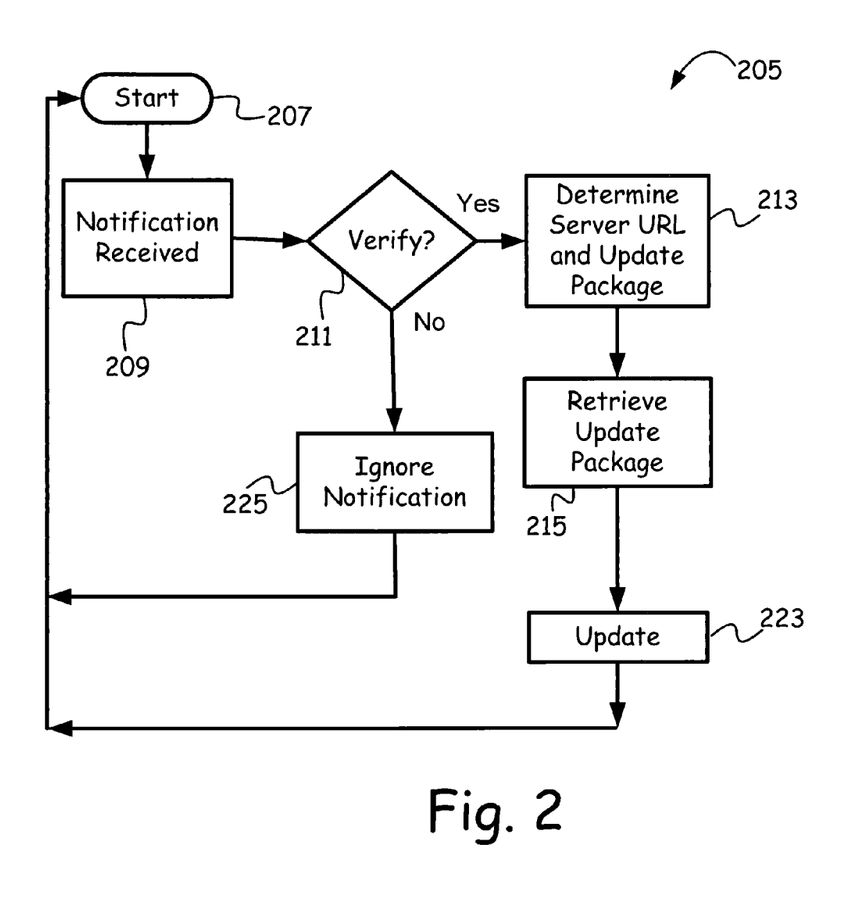
FIG. 2 is a flow diagram illustrating an exemplary method for an electronic device to receive a firmware/software update package notification according to an embodiment of the present invention.

FIG. 2 is a flow diagram 205 illustrating an exemplary method for an electronic device to receive a firmware/software update package notification according to an embodiment of the present invention. An electronic device may be for example, a mobile electronic device having software/firmware, such as, mobile cellular phone handsets, personal digital assistants (PDA's), pagers, MP3 players, digital cameras, etc.

In block 207 of FIG. 2, processing may begin with the electronic device waiting for incoming notifications, such as SMS notifications or other messages. At block 209, the electronic device may receive a notification, such as an update notification via an SMS message.

At block 211, the electronic device may verify whether the received notification is authentic, i.e., from an authorized source/sender, such as a customer care center 135 or an authorized server, for example, management server 109 using known secure identification techniques. If the electronic device determines that the notification is from an unknown source/sender or an unauthorized source/sender, then, at block 225, the electronic device ignores the received notification and records that a spurious unauthorized notification was received, before resuming processing at block 207.

If, however, at block 211, the electronic device verifies that the received notification is authentic, then at block 213, the electronic device may determine the URL of the server and update package that provides access to the associated firmware/software update. The notifications may also comprise location and identification information regarding a management server providing access to an update package and information regarding the update package. The location and identification information may also comprise at least one of a universal resource locator, an internet protocol address, a dynamic security key, end-user data, program update information, download scheduling information, and notification protocol information.

In an embodiment according to the present invention, the notification may also provide information regarding a location or address of the management server providing access to the update package, along with information about the update package, such as the update version number, etc. The electronic device may also be adapted to ensure that the management server referred to in the notification is an authorized server/sender.

In an embodiment according to the present invention, if the notification message does not specify a server where a downloadable update may be obtained, the electronic device may retrieve the address of a default management server which may have been previously provisioned in the electronic device (for example, during a bootstrap provisioning event). The electronic device may contact the default management server to retrieve an update package. The notification message may be authenticated however, prior to contacting the default management server to ensure that the notification was received from an authorized server/sender.

In an embodiment according to the present invention, the electronic device may contact a default management server whose address is available in the electronic device to determine the address of another server that may be able to provide access to another required update package.

At block 215, the electronic device may retrieve an update package employing the download agent or a browser (119 in FIG. 1), or for example, a wireless application protocol (WAP) browser. At block 223, the electronic device may employ the update agent (113 in FIG. 1) to update the firmware/software in the electronic device using the retrieved update package, before resuming processing at block 207.

Although an SMS based notification has been described herein, other types of notifications, such as instant messaging (IM), email notifications, (WAP) push messages, etc. are also contemplated. Methods similar to those described herein for verification of authenticity of received notifications may also be employed in other envisioned scenarios.

In an embodiment according to the present invention, the SMS based notification sent to the electronic device may be viewed by an end-user. The electronic device may also prompt the end-user by displaying a notification message in a display of the electronic device, providing the end-user with an opportunity to explicitly initiate an update process beginning with downloading an update package. Even when an end-user initiates an update process, the electronic device may be adapted to verify the authenticity of the notification before permitting the update package to download, thus providing the electronic device with an added measure of security should the end-user be fooled into initiating a spurious update package download.

In an embodiment of the present invention, a notification sent to the electronic device may be viewable by an end-user and the end-user may be prompted to initiate an update process. When the end-user initiates the update process, the electronic device may be adapted to determine the authenticity of the notification, and abort the update process if the notification is determined to be fraudulent. The electronic device may also be adapted to permit the update package to be downloaded if the notification is determined to be authentic.

Figure 2A:
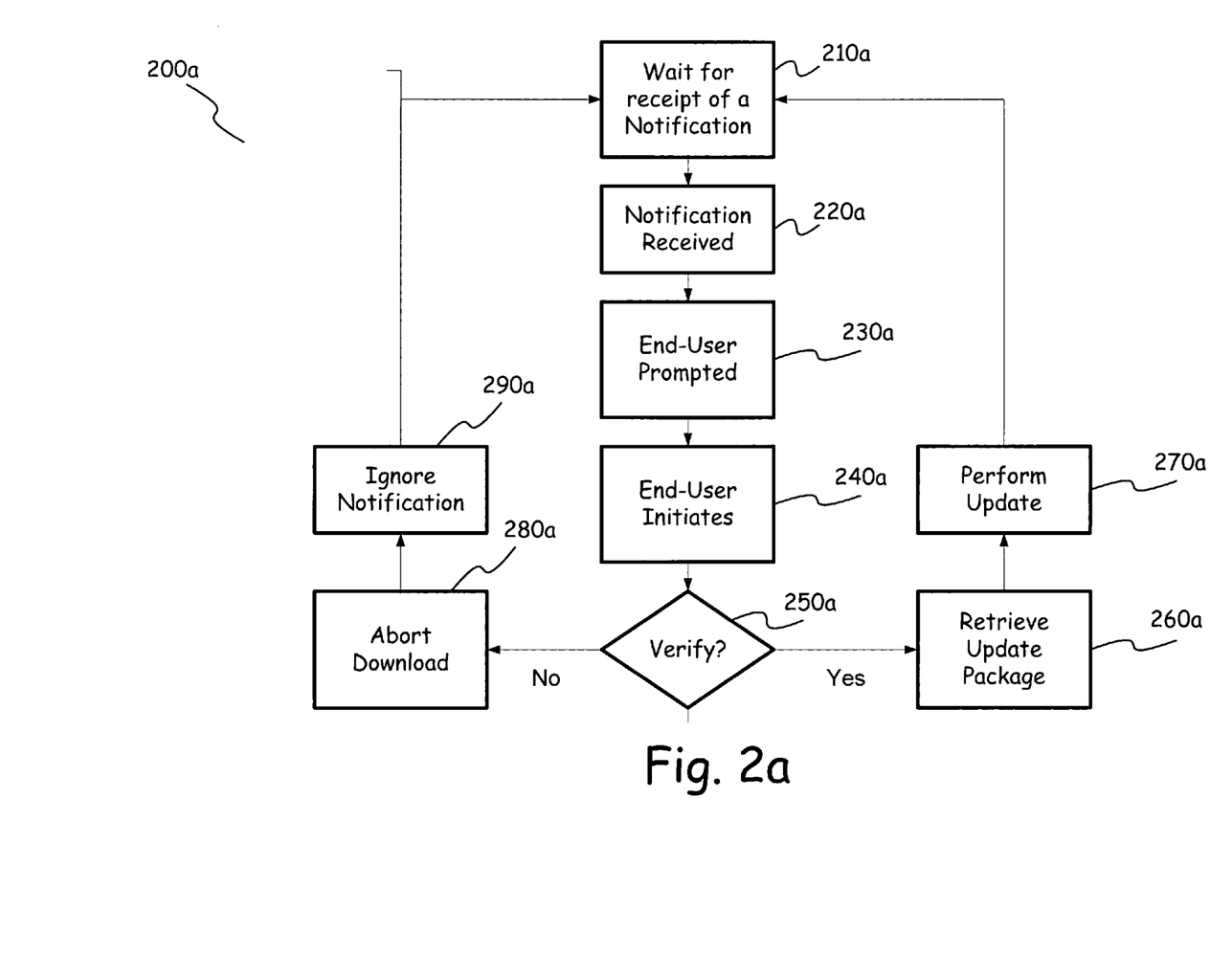
FIG. 2a is a flowchart illustrating an exemplary method for authenticating a notification with end-user involvement according to an embodiment of the present invention.

FIG. 2a is a flowchart 200a illustrating an exemplary method for authenticating a notification with end-user involvement according to an embodiment of the present invention. In FIG. 2a, initially an electronic device may be waiting to receive a notification 210a. While waiting to receive a notification the electronic device may be processing normally or performing the function for which the device was designed.

After some period of time the electronic device may receive a notification 220a. The notification may be discernable by an end-user of the electronic device. The notification may or may not be authentic, i.e., the notification may appear authentic to the end-user, but in reality may be a virus or other malicious, fraudulent notification.

The end-user may be prompted to initiate an update or modification by the received notification 230a. The end-user may be enticed or tricked into initiating a fraudulent download. The end-user may initiate an update 240a. The electronic device may verify the notification prior to permitting download 250a, even when an end-user has authorized and initiated the download. This provides an additional level of security which may protect the electronic device from malicious or fraudulent activity.

If the notification is found to be authentic, the electronic device may retrieve the update/modification package 260a and perform the update or modification 270a. However, if the notification is determined to be inauthentic or is unverified, the download procedure is aborted 280a and the notification is ignored. In either situation, retrieval or abort, after completing the task, the electronic device may return to normal processing and wait for further notifications 210a.

In an embodiment of the present invention, the electronic device comprises a security service preventing unauthorized updating of at least one of firmware and software in the electronic device. In an embodiment of the present invention, a security method may be applied for preventing unauthorized updates of at least one of firmware and software in the electronic device.

Figure 2B:
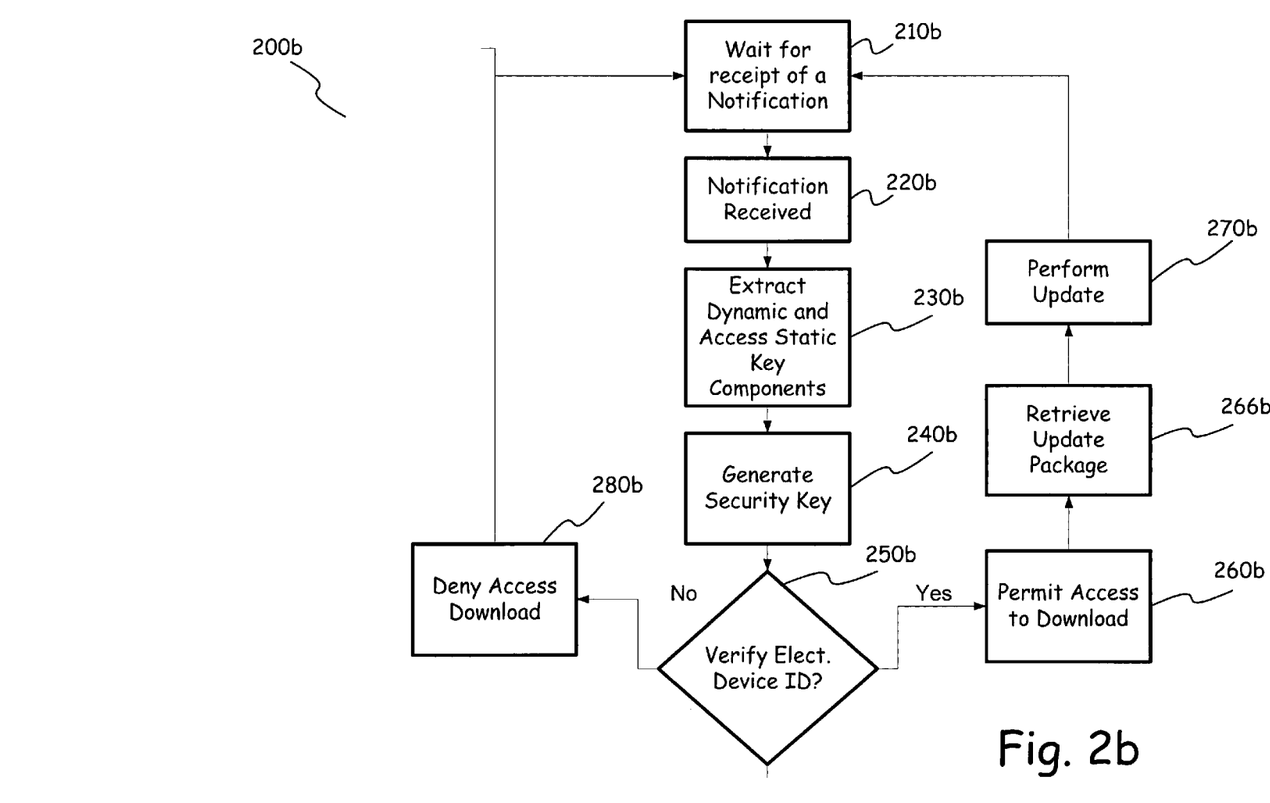
FIG. 2b is a flowchart illustrating an exemplary method of preventing unauthorized downloading of information by an electronic device according to an embodiment of the present invention.

FIG. 2b is a flowchart 200b illustrating an exemplary method of preventing unauthorized downloading of information by an electronic device according to an embodiment of the present invention. In FIG. 2b, initially an electronic device may be waiting to receive a notification 210b. While waiting to receive a notification, the electronic device may be processing normally, i.e., performing the function for which the device was designed. After some period of time, the electronic device may receive a notification 220b.

Upon receiving a notification, the electronic device may extract a dynamic key component from the notification message and then access a static key component stored in the electronic device 230b. The dynamic key component and the static key component may be used to generate or compute a security key 240b which may be used to permit access of the electronic device to a database/server of downloadable information, firmware/software updates, additional network services, etc. The electronic device may send the generated security key to the server containing the information/update.

The security key (may also comprise the electronic device identification information or end user information) is examined and determined to be either authentic or inauthentic, i.e., verified or unverified 250b. The security key may also comprise, form example, electronic device identification information and/or end user information.

If the security key is determined to be inauthentic or unverified, then the electronic device may be denied access to the server 280b, and thus denied the ability to perform the download or update activity. However, if the security is determined to be authentic or verified, then the electronic device may be permitted access to the server 260b and the ability to download the update/service, etc. The electronic device may then retrieve the update package 266b and perform the update or modification 270b. In either situation, retrieval or abort, after completing the task, the electronic device may return to normal processing and wait for further notifications 210a.

Although a system and method according to the present invention has been described in connection with a preferred embodiment, it is not intended to be limited to the specific form set forth herein, but on the contrary, is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method of updating mobile electronic devices, the method comprising:

informing a notification history server of notifications sent by various senders of updates to a mobile electronic device, the notification history server keeping a record of all verified and unverified notifications, the notification history server being distinct from the various senders of updates and distinct from a device management server managing the mobile electronic device;

receiving a notification in the mobile electronic device that an update is available from a particular sender;

determining authorization of the received notification in the mobile electronic device by sending, by the mobile electronic device, information retrieved from the received notification to the notification history server, and determining, by comparison, whether the notification history server has previous verified or unverified records of the notification from the particular sender using the information sent by the electronic device thereby avoiding testing of each notification;

the mobile electronic device downloading the available update from the particular sender if the notification history server confirms having the verified record of notification from the particular sender of the notification; and the mobile electronic device ignoring the available update from the particular sender if the notification history server confirms having an unverified record of the notification from the particular sender of the notification.

2. The method according to claim 1, further comprising:
simultaneously informing the notification history server that the notification has been sent to the electronic device.

3. The method according to claim 1, further comprising:
ignoring the notification in the electronic device upon determining that the notification is unverified;
recording that an unverified notification has been received; and
waiting to receive another notification in the electronic device.

4. The method according to claim 1, further comprising determining identification information of a server and update package associated with the notification upon determining that the notification received in the electronic device is verified.

5. The method according to claim 4, further comprising:
retrieving the update package; and
performing an update of at least one of firmware and software resident in the electronic device.

6. The method according to claim 1, wherein the notification comprises one of a short message service (SIMS) notification, an instant messaging (IM) notification, an email notification, a wireless application protocol (WAP) push message notification, and an enhanced messaging service (EMS) notification.

7. The method according to claim 1, wherein the electronic device comprises one of a mobile cellular phone handset, a personal digital assistant, a pager, an MP3 player, and a digital camera.

8. The method according to claim 1, wherein determining the authorization of the notification in the electronic device further comprises determining whether the notification was sent from an authorized server.

9. The method according to claim 8, wherein an authorized server comprises one of a management server and a customer care center.

10. The method according to claim 1, wherein the notification comprises location and identification information regarding a management server providing access to an update package and information regarding the update package.

11. The method according to claim 10, wherein location and identification information comprise at least one of a universal resource locator (URL), an interact protocol (IP) address, a dynamic security key, end-user data, program update information, download scheduling information, and notification protocol information.

12. The method according to claim 1, further comprising retrieving an update package from a default management server by accessing an address of the default management server when no server address information is included in the notification, the address of the default management server being provisioned in the electronic device during a bootstrap provisioning event.

13. The method according to claim 12, wherein retrieving the update package from the default management server is performed after authorization of the notification message.

14. The method according to claim 1, further comprising:
retrieving an update package via a download agent in the electronic device; and
updating at least one of firmware and software in the electronic device via an update agent in the electronic device.

15. The method according to claim 1, further comprising preventing unauthorized updates of at least one of firmware and software in the electronic device.

16. The method according to claim 15, wherein preventing unauthorized updates further comprises:
when a notification sent to the electronic device is discernable by an end-user and the end-user is prompted to initiate an update process, and
when the end-user initiates the update process, the electronic device is adapted to determine the authorization of the notification, and abort the update process if the notification is determined to be unverified, and permit the update package to be downloaded, if the notification is determined to be verified.

17. The method according to claim 15, wherein preventing unauthorized updates further comprises:
receiving a dynamic key component from a management server in the electronic device;
accessing a static key component from memory in the electronic device; and
instructing a download agent to use the dynamic key component and the static key component to generate a security key, wherein the generated security key facilitates access to a downloadable update package in an update package repository if the electronic device is authorized access to the update package, otherwise the electronic device is denied access to the update package.

18. The method according to claim 1, further comprising provisioning an address of a management server in the electronic device during a bootstrap provisioning event by sending a notification, the notification comprising server address information, and wherein the electronic device is adapted to access and employ the address of the management server provisioned in the electronic device after the bootstrap provisioning event.

19. A mobile services network at least comprising:
at least one mobile electronic device;
a device management server communicatively linked with the at least one mobile electronic device via a communication link for managing the at least one mobile device; and
a notification history server distinct from the device management server and operatively connected to the management server, the notification history server comprising a record of all verified notifications and unverified notifications sent to the at least one mobile electronic device by various senders, the various senders being distinct from the notification history server, wherein the notification history server is able to determine authorization of an available update by comparing whether the notification history server has previous verified or unverified records of notification from a particular sender thereby avoiding testing of each notification;

wherein the mobile electronic device is adapted to:

receive notifications as to available updates to firmware on the mobile device;

send information retrieved from the notifications to the notification history server;

download available updates associated with notifications sent to the notification history server for which the notification history server has a previous verified record from the particular sender; and ignore available updates associated with notifications to the notification history server for which the notification history server has a previous unverified record from the particular sender.

20. The network according to claim 19, wherein the electronic device at least comprises:

non-volatile memory;

a short message entity;

random access memory; and security services.

21. The network according to claim 20, wherein the non-volatile memory in the electronic device at least stores:

an update agent;

a firmware and real-time operating system;

an operating system layer;

a download agent or browser; and an end-user related data and content.

22. The network according to claim 19, wherein the electronic device comprises one of a mobile cellular phone handset, personal digital assistant, pager, MP3 player, and a digital camera.

23. The network according to claim 19, wherein the electronic device is adapted to receive notifications informing the electronic device of availability of update packages at the management server.

24. The network according to claim 23, wherein the notification history server is adapted to determine whether a notification is authorized by examining message identification information in the notifications.

25. The network according to claim 23, wherein the electronic device is adapted to download an update package from an update package repository using an update agent upon determining that a notification received in the electronic device is authorized authentic.

26. The network according to claim 23, wherein the electronic device is adapted to determine whether a notification originated from an authorized sender.

27. The network according to claim 26, wherein an authorized sender is at least one of the management server and a customer care center resident in the network.

28. The network according to claim 19, further comprising a Short message center (SMC) adapted to store and forward messages to and from the electronic device, wherein the short message center (SMC) is adapted to send, upon instruction from the management server or a customer care center, notifications to the electronic device regarding availability of update packages.

29. The network according to claim 19, wherein notifications comprise at least one of a short message service (SMS) notification, an instant messaging (IM) notification, an email notification, a wireless application protocol (WAP) push message notification, and an enhanced messaging service (EMS) notification.

30. The network according to claim 29, wherein notifications further comprise at least one user data field containing message identification information.

31. The network according to claim 29, wherein notifications further comprise location and identification information regarding a management server providing access to an update package and information regarding the update package.

32. The network according to claim 31, wherein location and identification information comprise at least one of a universal resource locator, an internet protocol address, a dynamic security key, end-user data, program update information, download scheduling information, and notification protocol information.

33. The network according to claim 19, wherein upon determining that a notification received in the electronic device is unverified, the electronic device is adapted to ignore the notification and wait for another notification, and a record is created recording that an unverified notification has been received.

34. The network according to claim 19, wherein the management server comprises the notification history server and an update package repository.

35. The network according to claim 19, wherein the notification history server is incorporated into a short message center in the network.

36. The network according to claim 19, further comprising a security service in the electronic device for preventing unauthorized updating of at least one of firmware and software in the electronic device.

37. The network according to claim 36, wherein preventing unauthorized updates further comprises:

when a notification sent to the electronic device is discernable by an end-user and the end-user is prompted to initiate an update process, and when the end-user initiates the update process, the electronic device is adapted to determine the authorization of the notification, and abort the update process if the notification is determined to be unverified, and permit the update package to be downloaded, if the notification is determined to be verified.

38. The network according to claim 36, wherein preventing unauthorized updates further comprises:

receiving a dynamic key component from a management server in the electronic device;

accessing a static key component from memory in the electronic device; and instructing a download agent to use the dynamic key component and the static key component to generate a security key, wherein the generated security key facilitates access to a downloadable update package in an update package repository if the electronic device is authorized access to the update package, otherwise the electronic device is denied access to the update package.

39. The network according to claim 19, wherein the network is adapted to provision the address of the management server in the electronic device during a bootstrap provisioning event by sending a notification, the notification comprising server address information, and wherein the electronic device is adapted to access and employ the address of the management server provisioned in the electronic device after the bootstrap provisioning event.

* * * * *

UNITED STATES PATENT AND TRADEMARK OFFICE
CERTIFICATE OF CORRECTION

| | |
|---|---|
| PATENT NO. | : 7,890,427 B1 |
| APPLICATION NO. | : 10/754378 |
| DATED | : February 15, 2011 |
| INVENTOR(S) | : Bindu Rama Rao et al. |

It is certified that error appears in the above-identified patent and that said Letters Patent is hereby corrected as shown below:

In column 13, line 44, in Claim 6, delete "(SIMS)" and insert -- (SMS) --, therefor.

In column 13, line 66, in Claim 11, delete "interact" and insert -- internet --, therefor.

In column 15, line 57, in Claim 28, delete "Short" and insert -- short --, therefor.

Signed and Sealed this
Thirty-first Day of May, 2011

David J. Kappos
*Director of the United States Patent and Trademark Office*